United States Patent
Johnson et al.

(12)

(10) Patent No.: US 10,208,676 B2
(45) Date of Patent: Feb. 19, 2019

(54) GAS TURBINE ENGINE DUAL SEALING CYLINDRICAL VARIABLE BLEED VALVE

(71) Applicant: General Electric Company, Schenectady, NY (US)

(72) Inventors: Steven Douglas Johnson, Milford, OH (US); Brandon Wayne Miller, Liberty Township, OH (US); Craig Alan Gonyou, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 15/083,392

(22) Filed: Mar. 29, 2016

(65) Prior Publication Data
US 2017/0284303 A1 Oct. 5, 2017

(51) Int. Cl.
*F02C 9/18* (2006.01)
*B64D 13/08* (2006.01)
(Continued)

(52) U.S. Cl.
CPC .............. *F02C 9/18* (2013.01); *B64D 13/08* (2013.01); *F01D 17/105* (2013.01); *F01D 25/14* (2013.01);
(Continued)

(58) Field of Classification Search
CPC ...... F02C 9/18; F02C 3/04; F02C 7/18; F02C 6/08; F02K 3/06; F02K 3/075; F01D 25/14; B64D 13/08
See application file for complete search history.

(56) References Cited

U.S. PATENT DOCUMENTS

| 3,638,428 A | 2/1972 | Shipley et al. |
| 4,102,595 A | 7/1978 | Wibbelsman |

(Continued)

FOREIGN PATENT DOCUMENTS

| CN | 202483722 U | 10/2012 |
| CN | 104246142 A | 12/2014 |

(Continued)

OTHER PUBLICATIONS

Extended European Search Report and Opinion issued in connection with corresponding EP Application No. 17163012.2 dated Aug. 3, 2017.
(Continued)

*Primary Examiner* — Craig Kim
(74) *Attorney, Agent, or Firm* — General Electric Company; Brian Overbeck (57) ABSTRACT

Axially adjacent annular booster bleed aft and forward plenums with annular common wall therebetween extend radially outwardly from transition duct. Variable bleed valve includes bleed valve door in bleed inlet in transition duct, attached to rotatable valve body rotatable about axis of rotation, operable to open and close bleed inlet to aft plenum. Rotatable plenum door clocked or circumferentially spaced apart from variable bleed valve door and attached to rotatable valve body, operable to close and open up and control flow through an inter plenum aperture in common wall. Aft and forward bleed exhaust ducts extend from booster bleed aft and forward plenums to bypass flow path. One or more heat exchanger, such as from thermal management system, may be disposed in the bleed exhaust ducts. Heat exchangers may be used for cooling oil for power gear box and/or engine bearings, air conditioning, or variable frequency generator.

26 Claims, 10 Drawing Sheets

(51) Int. Cl.
*F01D 25/14* (2006.01)
*F02C 3/04* (2006.01)
*F02C 7/18* (2006.01)
*F02K 3/06* (2006.01)
*F01D 17/10* (2006.01)
*F02K 3/075* (2006.01)

(52) U.S. Cl.
CPC .................. *F02C 3/04* (2013.01); *F02C 7/18* (2013.01); *F02K 3/06* (2013.01); *F02K 3/075* (2013.01); *F05D 2220/323* (2013.01); *F05D 2250/411* (2013.01); *F05D 2260/213* (2013.01); *F05D 2270/101* (2013.01); *F05D 2270/112* (2013.01)

(56) References Cited

U.S. PATENT DOCUMENTS

| | | | |
|---|---|---|---|
| 4,463,552 A | | 8/1984 | Monhardt et al. |
| 4,715,779 A | * | 12/1987 | Suciu .................. F01D 17/105 |
| | | | 251/229 |
| 5,279,109 A | * | 1/1994 | Liu .......................... F02C 7/052 |
| | | | 60/39.092 |
| 5,281,087 A | * | 1/1994 | Hines .................. F01D 17/162 |
| | | | 415/160 |
| 7,716,914 B2 | | 5/2010 | Schilling |
| 7,832,193 B2 | | 11/2010 | Orlando et al. |
| 8,904,753 B2 | | 12/2014 | Murphy |
| 2008/0098713 A1 | | 5/2008 | Orlando et al. |
| 2008/0230651 A1 | * | 9/2008 | Porte ...................... B64D 13/06 |
| | | | 244/118.5 |
| 2013/0259638 A1 | | 10/2013 | Suciu et al. |
| 2013/0259639 A1 | | 10/2013 | Suciu et al. |
| 2013/0283762 A1 | | 10/2013 | Simpson et al. |
| 2014/0109589 A1 | * | 4/2014 | Pritchard, Jr. .......... F02K 3/075 |
| | | | 60/779 |
| 2014/0245747 A1 | | 9/2014 | Pritchard, Jr. et al. |
| 2015/0247462 A1 | | 9/2015 | Suciu et al. |
| 2015/0275757 A1 | | 10/2015 | Turner et al. |
| 2015/0284070 A1 | | 10/2015 | Breeze-Stringfellow et al. |
| 2015/0291276 A1 | | 10/2015 | Zatorski et al. |
| 2015/0308289 A1 | | 10/2015 | Lacroix et al. |
| 2016/0010487 A1 | | 1/2016 | Breeze-Stringfellow et al. |

FOREIGN PATENT DOCUMENTS

| | | |
|---|---|---|
| EP | 0 511 770 A1 | 4/1992 |
| EP | 1 892 399 A2 | 2/2008 |
| GB | 2 243 871 A | 11/1991 |
| GB | 2536357 A | 9/2016 |
| WO | 2015/011413 A1 | 1/2015 |

OTHER PUBLICATIONS

Machine Translation and a Chinese Office Action and Search Report issued in connection with corresponding CN Application No. 201710196619.8 dated Jun. 27, 2018.

* cited by examiner

GAS TURBINE ENGINE DUAL SEALING CYLINDRICAL VARIABLE BLEED VALVE

BACKGROUND OF THE INVENTION

Field of the Invention

The invention relates to gas turbine engine variable bleed valves between a booster and a core engine compressor and, more particularly, to such valves used to prevent surge and help provide thermal management.

Description of Related Art

It is well known in the gas turbine engine field to provide variable bleed valves (VBVs) around the engine, typically, doors that open to provide a bleed flowpath to bleed off compressed air between the booster and core engine compressor of gas turbine engines. The air is often bled from what is referred to as a goose neck flowpath between the booster and core engine compressor. Aircraft fan jet gas turbine engines and marine and industrial derivatives of such engines have employed various forms of curved flow paths and VBV bleed doors that are retracted into the flowpath casing so as to form an entrance to a bleed duct that bleeds booster or low pressure compressor discharge airflow to avoid engine surge and to improve operability of the engine.

Turbofan jet engines, such as the General Electric CF6 and GE90 series of engines, have in series relationship, a fan, a booster, and a core engine compressor, whereby a portion of the air passing through the fan is ducted to the booster and then the core engine compressor. In order to match the inlet airflow of the core engine compressor to its flight operational requirements and to prevent booster stall, a booster variable bleed valve (VBV) is provided in the form of a booster bleed duct having an inlet between the booster and the core engine compressor and an outlet to the fan duct. Opening and closing of the booster bleed duct is conventionally provided by a circumferentially disposed plurality of pivotal doors that retract into the engine structure or casing and are operated by a single unison ring powered by one or more fuel powered actuators. An example of such a stall prevention system using a retracting pivotal door, as compared to a sliding door or valve in the Monhardt patent, is disclosed in U.S. Pat. No. 3,638,428 entitled "Bypass Valve Mechanism" by Shipley et al. The operation of the VBV is scheduled by the engine controller either a mechanical or digital electronic type may be used.

Thermal management systems may be used with gas turbine engines to manage various aircraft and engine heat loads and cool air, oil, and fuel used as a cooling fluid. Bleed air is also supplied to the aircraft and is often referred to as customer bleed air. Heat exchangers in the thermal management systems may be cooled by fan air, fan bypass duct air, and air passing through the goose neck and bled off by variable bleed valves (VBVs) around the engine. These valves open to provide a bleed flowpath to bleed off compressed air between the booster and core engine compressor of gas turbine engines.

Modern high bypass ratio engines incorporate higher pressure core compressors and lower pressure boosters and, thus, produce less pressure difference between the booster exit and the fan bypass duct. This increases the difficulty of bleeding sufficient amounts of air from downstream of the booster to the fan bypass duct for protecting boosters from stall. The booster stall margin is controlled by opening the VBV doors to dump some of the booster flow overboard so as to control the booster operating line to a point below its stall line.

Thus, it is highly desirable to have a variable bleed valve and system for high bypass ratio engines incorporate higher pressure core compressors and lower pressure boosters bleed sufficient amounts of air from downstream of the booster for protecting boosters from stall. It is also highly desirable to have an efficient cooling air bleed system to help provide cooling air to thermal management systems for the engine and aircraft and to the aircraft as what often is referred to as customer bleed air.

SUMMARY OF THE INVENTION

A gas turbine engine variable bleed apparatus includes axially adjacent annular booster bleed aft and forward plenums and an annular common wall therebetween extending generally radially outwardly from a transition duct and a variable bleed valve including a variable bleed valve door disposed in a bleed inlet in the transition duct. The variable bleed valve door is part of or attached to a rotatable valve body pivotable or rotatable about an axis of rotation and is operable to open and close the bleed inlet to the aft plenum located and extending radially outwardly from the transition duct and the bleed inlet. A rotatable plenum door is clocked or circumferentially spaced apart from the variable bleed valve door and part of or attached to the rotatable valve body. The rotatable plenum door is operable to close and open up and control flow through an inter plenum aperture in the common wall between the axially adjacent aft and forward plenums. The rotatable plenum door, the inter plenum aperture, and at least a portion of the common wall may be cylindrical and circumscribed about the axis of rotation.

At least one heat exchanger may be disposed in at least one of aft and forward bleed exhaust ducts in fluid communication with and extending from the booster bleed aft and forward plenums respectively. The aft and forward bleed exhaust ducts may extend to a bypass flow path. Controlled variable or passive fixed louvers may be in one of the aft bleed exhaust ducts.

A chute may be on a radially outer side of the variable bleed valve door and the chute may be curved and operable for directing bleed air entering the bleed inlets to and through the aft bleed exhaust duct.

An aircraft turbofan gas turbine engine having an engine centerline axis includes in downstream serial flow communication, a fan, a low pressure compressor or booster, a high pressure compressor, a combustor, a high pressure turbine, and a low pressure turbine. The high pressure turbine is drivingly connected to the high pressure compressor and the low pressure turbine is drivingly connected to both the fan and the low pressure compressor or the booster. The gas turbine engine variable bleed apparatus circumscribe the engine centerline axis and the axially adjacent annular booster bleed aft and forward plenums and an annular common wall therebetween extending generally radially outwardly from a transition duct between the low pressure compressor or the booster and the high pressure compressor. A plurality of bleed inlets in a circular row are disposed through an outer annular wall of the transition duct and a variable bleed valve including a variable bleed valve door are disposed in each of the bleed inlets.

Aft and forward bleed exhaust ducts may be in fluid communication with and extend from booster bleed aft and forward plenums respectively to a bypass flow path and one or more heat exchangers, which may be in a thermal management system, may be disposed in one or more aft bleed exhaust ducts respectively. Controlled variable or passive fixed louvers may be in the aft and forward bleed exhaust ducts.

The aircraft turbofan gas turbine engine may include an annular fan frame circumscribed about the engine centerline axis and supporting the fan and the variable bleed valve door may be hinged by a hinge attached to a fan hub frame of the fan frame. A thermal management system may include one or more heat exchangers disposed in the one or more aft bleed exhaust ducts respectively.

The aircraft turbofan gas turbine engine may be ducted with a fan casing circumscribing the engine centerline axis and surrounding the fan and a bypass duct containing the bypass flow path. The bypass duct located downstream or aft of the fan and spaced radially outwardly from the booster. An annular fan frame supporting the fan casing includes an annular outer frame casing, the fan hub frame, and a plurality of circumferentially spaced apart duct struts extending between the outer frame casing and the fan hub frame. A power gear box may be operably disposed between the low pressure turbine and the fan for adjusting rotational speed of the fan relative to the low pressure turbine, engine bearings rotatably support at least one of the low pressure turbine, the fan, the high pressure compressor and the high pressure turbine. One of the heat exchangers may be an engine air-cooled oil cooler operable for cooling oil for the power gear box and/or engine bearings. Second and third ones of the heat exchangers may be disposed in second and third ones of the aft bleed exhaust ducts respectively and may be an air conditioning pre-cooler heat exchanger operable for being selectively cooled using air conditioning controlled variable louvers in the second one of the aft bleed exhaust ducts and a variable frequency generator air-cooled oil cooler for cooling oil in a variable frequency generator lubricating circuit for a variable frequency generator.

The aircraft turbofan gas turbine engine may be an unducted or open rotor aircraft turbofan gas turbine engine wherein the fan is unducted and is located forward or upstream of a circular row of unducted stator vanes.

An annular fan frame rotatably supports the fan and an annular fan hub frame supports an engine nacelle inwardly bounding the bypass flow path. A power gear box may be operably disposed between the low pressure turbine and the fan for adjusting rotational speed of the fan relative to the low pressure turbine.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
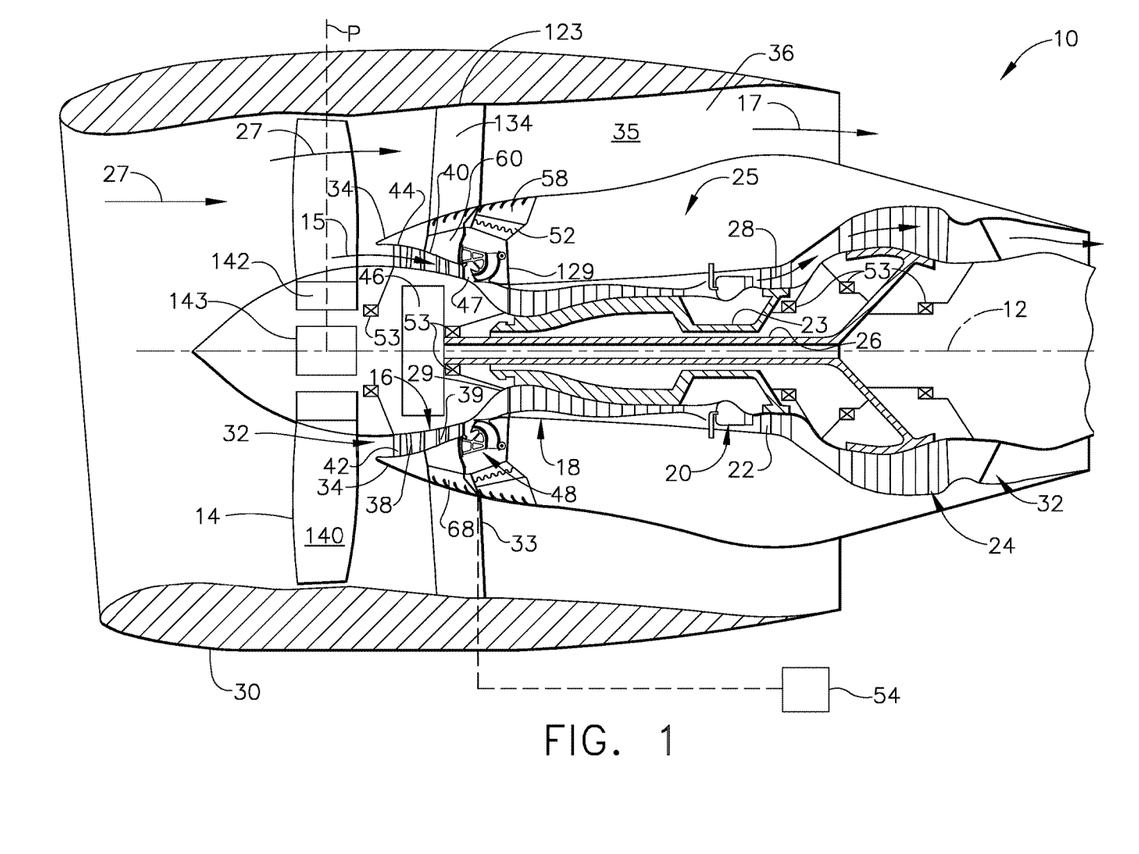
FIG. 1 is a longitudinal part sectional and part diagrammatical view illustration of an exemplary embodiment of an aircraft turbofan gas turbine engine with a variable bleed valve (VBV) with multiple bleed passages in a transition duct between a booster and a high pressure compressor that turns core airflow exiting out of the booster.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a low pressure compressor or booster 16, a high pressure compressor 18, a combustor 20, a high pressure turbine (HPT) 22, and a low pressure turbine (LPT) 24. A core engine 25 includes the HPT or high pressure turbine 22 drivingly connected by a high pressure drive shaft 23 to the high pressure compressor 18 and the combustor 20. The LPT or low pressure turbine 24 is drivingly connected by a low pressure drive shaft 26 to both the fan 14 and the booster 16.

Figure 11:
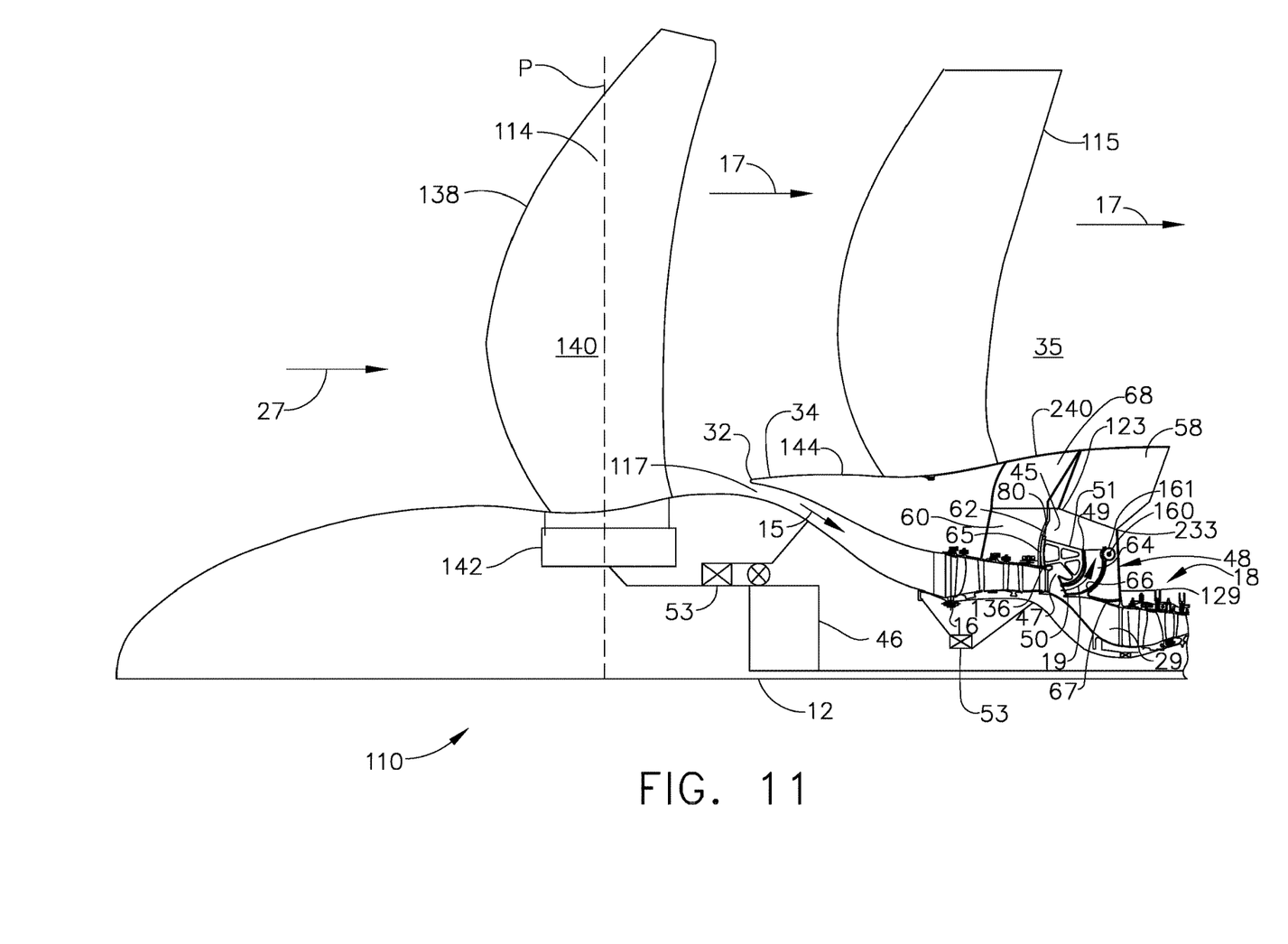
FIG. 11 is a cross sectional diagrammatical view illustration of a forward section of an unducted or open rotor aircraft turbofan gas turbine engine with a variable bleed valve with multiple bleed passages in a transition duct.

The fan 14 may be rotatable about the engine centerline axis 12 by the low pressure drive shaft 26 across a power gear box 46 as illustrated in FIG. 1. The power gear box 46 includes a plurality of gears for adjusting the rotational speed of the fan 14 relative to the low pressure drive shaft 26 and the low pressure turbine 24. The fan 14 may be a variable pitch fan 138 having a plurality of variable pitch fan blades 140 coupled to a disk 143 as illustrated in FIGS. 1 and 11. As illustrated in FIG. 1, the fan blades 140 extend radially outwardly from the disk 143. Each fan blade 140 is rotatable relative to the disk 143 about a pitch axis P by virtue of the fan blades 140 being operatively coupled to a suitable actuation mechanism 142 configured to collectively vary the pitch of the fan blades 140 in unison.

In typical operation, air 27 is pressurized by the fan 14 and produces an inner or core airflow 15 channeled through the booster 16 which further pressurizes the core airflow 15. The pressurized air of the core airflow 15 is then flowed to the high pressure compressor 18 which further pressurizes the air. The pressurized air is mixed with fuel in the combustor 20 for generating hot combustion gases 28 that flow downstream, in turn, through the HPT 22 and the LPT 24. Engine bearings 53 rotatably support the high pressure compressor 18 and the HPT 22 and rotatably support the fan 14 and the LPT 24.

A flow splitter 34 surrounding the booster 16 immediately behind the fan 14 includes a sharp leading edge 32 which splits the fan air 27 pressurized by the fan 14 into a radially inner stream (core airflow 15) channeled through the booster 16 and a radially outer stream or bypass airflow 17 is channeled into a bypass flow path 35 through a bypass duct 36 spaced radially outwardly from the booster 16. A fan casing 30 surrounding the fan 14 and the bypass duct 36 is supported by an annular fan frame 33 circumscribed about the engine centerline axis 12. The booster 16 includes alternating annular rows 44 of booster blades and vanes 38, 42 extending radially outwardly and inwardly across a booster flowpath 39 in a booster duct 40. The annular row of booster blades 38 rare suitably joined to the low pressure drive shaft 26. The booster 16 is located forward of the fan frame 33 and radially in board of the flow splitter 34.

The fan frame 33 includes an annular outer frame casing 123, a fan hub frame 129, and a plurality of circumferentially spaced apart duct struts 134 extending therebetween. The duct struts 134 are airfoil shaped since bypass air passes between the adjacent ones thereof. A transition duct 29 also referred to as a goose neck is located at a radially inner end 136 of the fan hub frame 129 and is axially disposed between and in fluid communication with the booster 16 and the high pressure compressor 18 of the core engine 25.

Figure 2:
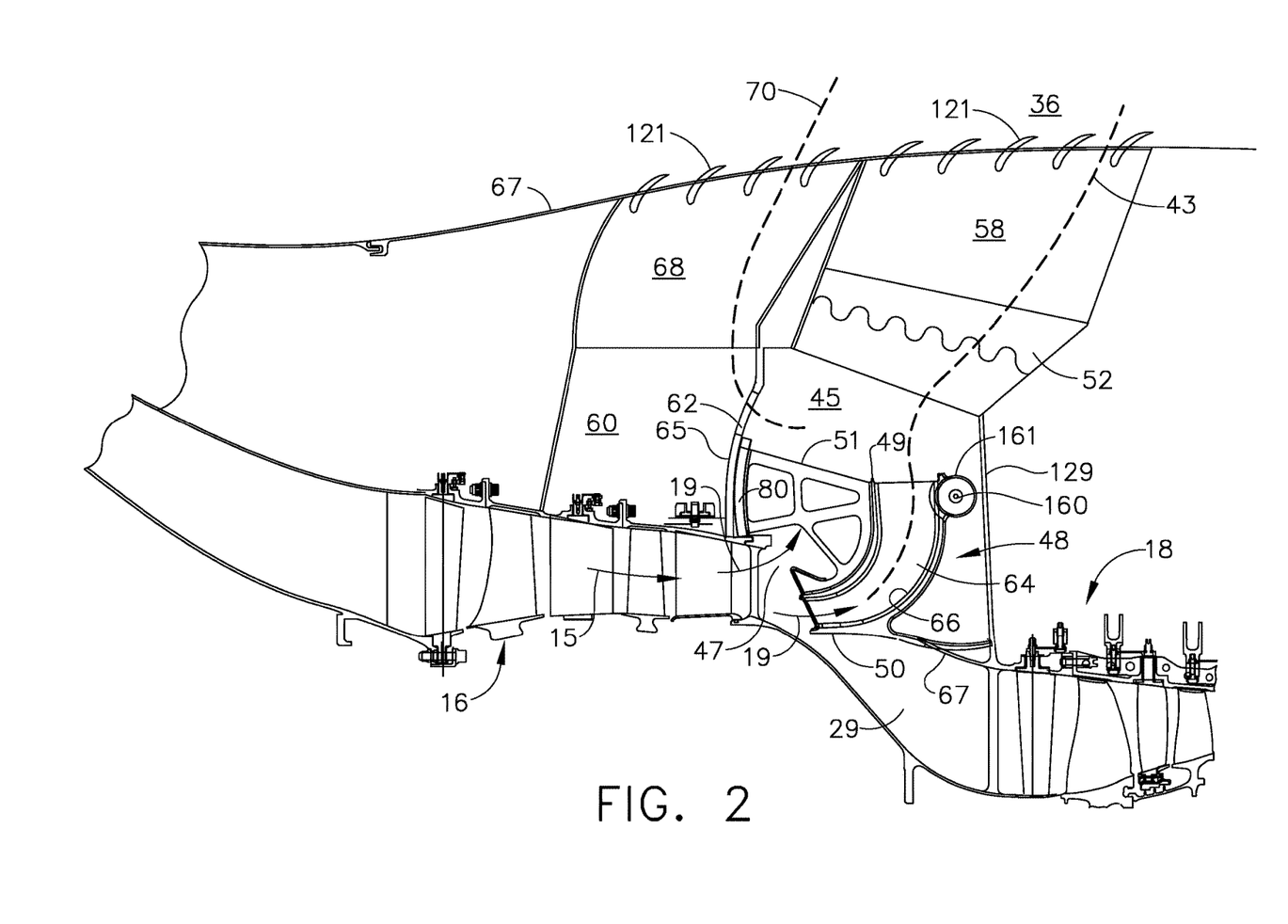
FIG. 2 is an enlarged part sectional and part diagrammatical view illustration of the variable bleed valve illustrated in FIG. 1 and aft and forward bleed passages open.

Referring to FIGS. 1 and 2, a plurality (10 are illustrated in the FIGS.) of bleed inlets 47 or openings in a circular row or circumferentially disposed through the outer annular wall 67 of the transition duct 29 between booster 16 and the high pressure compressor 18. The outer annular wall 67 may be conical or curved. A variable bleed apparatus 48 is used to bleed the core airflow 15 between booster 16 and the high pressure compressor 18 to prevent the booster 16 from stalling under certain engine operating conditions.

Figure 3:
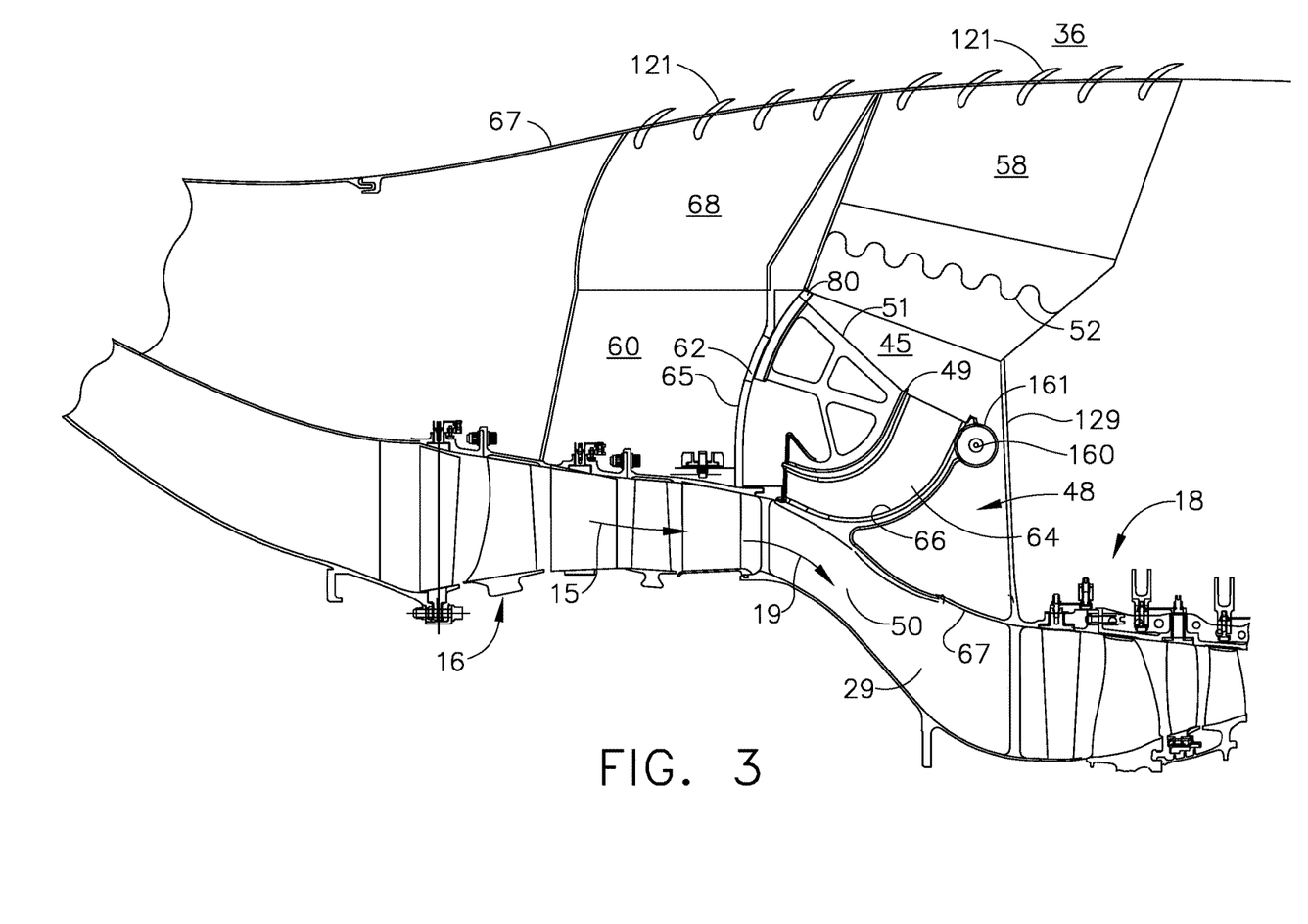
FIG. 3 is a sectional view illustration of the valve and aft and forward bleed passages illustrated in FIG. 2 in a fully closed position.

The variable bleed apparatus 48 includes variable bleed valves 49 (VBV) including a variable bleed valve door 50 disposed in each of the bleed inlets 47 to modulate the amount of bleed air 19 extracted from the core airflow 15. The VBV door 50 is part of or attached to a rotatable valve body 51. The VBV door 50 is illustrated in FIG. 2 in an open position and is illustrated in FIG. 3 in a closed position completely closing the bleed inlet 47. The VBV doors 50 are operable to open the bleed inlets 47 to an annular booster bleed aft plenum 45 located and extending radially outwardly from the transition duct 29 and the bleed inlets 47. Aft booster bleed flow paths 43 lead from the aft plenum 45 through aft bleed exhaust ducts 58 into the bypass airflow 17 and the bypass flow path 35 in the bypass duct 36. Louvers 121 may be used to turn and direct the bleed air 19 flowing from the aft booster bleed flow paths 43 through the aft bleed exhaust ducts 58 into the bypass airflow 17. The louvers 121 may be controlled variable louvers or passive fixed louvers. Heat exchangers 52 belonging to a thermal management system 54 may be placed in one or more of the aft bleed exhaust ducts 58.

The VBV door 50 is used to bleed air 19 and extract ice from the booster and the transition duct 29 before it reaches the high pressure compressor 18 where it can cause stall conditions, airflow instability conditions, and quench the flame or combustion in the combustor 20.

Referring back to FIG. 2, the rotatable valve body 51 and the VBV door 50 are pivotable or rotatable about an axis of rotation exemplified by a hinge axis 160 of a hinge 161. The rotatable valve body 51 and the VBV door 50 may be actuated by actuators (not shown) that rotate the rotatable valve body 51 and the VBV door 50 about the hinge axis 160. It is well known to operate or rotate VBV doors open and close using actuators, unison rings, and bell cranks for positioning the doors. One example of this may be found in U.S. Pat. No. 3,638,428 to Shipley et al., Feb. 1, 1972, entitled "BYPASS VALVE MECHANISM". The VBV door 50 is hinged by the hinge 161 which is attached to or mounted on the fan hub frame 129 of the fan frame 33. The exemplary embodiment of the variable bleed valve 49 includes a chute 64 on a radially outer side 66 of the VBV door 50. The chute 64 is curved so as to help direct bleed air entering the bleed inlets 47 to more efficiently enter and pass through the aft bleed exhaust duct 58.

An annular booster bleed forward plenum 60 is located and extends radially outwardly from the booster duct 40 of the booster 16. Axially adjacent aft and forward plenums 45, 60 are connected by a plenum passage illustrated herein as an inter plenum aperture 62 in an annular common wall 65 separating the axially adjacent aft and forward plenums 45, 60. Forward booster bleed flow paths 70 lead from the forward plenums 60 through forward bleed exhaust ducts 68 into the bypass airflow 17 in the bypass duct 36. The forward booster bleed flow paths 70 are used herein for bleeding the bleed air 19 extracted from the core airflow 15 and flowing it through the forward bleed exhaust ducts 68 to the bypass duct 36 to maintain booster and compressor operability at several engine operating conditions. Louvers 121 may be used to turn and direct the bleed air 19 flowing in the forward booster bleed flow paths 70 through the forward bleed exhaust ducts 68 into the bypass airflow 17.

A rotatable plenum door 80 is part of or attached to the rotatable valve body 51 and is operable to close and open up and control flow through the inter plenum aperture 62 in the common wall 65 between the axially adjacent aft and forward plenums 45, 60. The rotatable plenum door 80 is clocked or circumferentially spaced apart from the variable bleed valve door 50. The plenum door 80, the inter plenum aperture 62, and at least a portion of the common wall 65 may all be cylindrical and circumscribed about the hinge axis 160. The plenum door 80 is supported by a plenum door support frame 83 and rotatable about the hinge axis 160. FIG. 2 illustrates the aft and forward booster bleed flow paths 43, 70 from the aft plenums 45 fully open. The variable bleed valve door 50 in the bleed inlet 47 and the plenum door 80 in fully open positions in FIG. 2.

Figure 4:
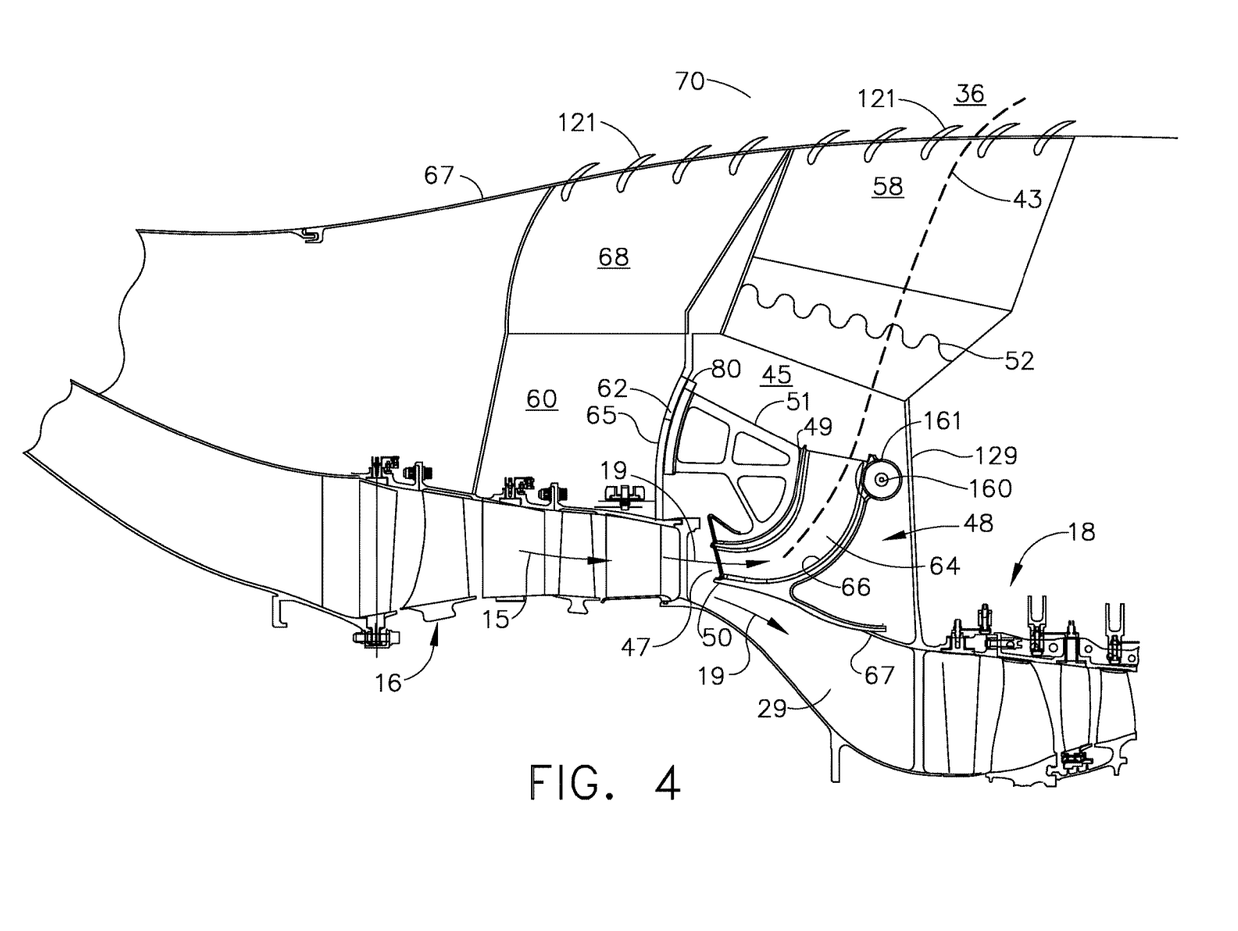
FIG. 4 is a sectional view illustration of the valve and the aft bleed passage illustrated in FIG. 2 in a fully open position and the forward bleed passage in a fully closed position.

FIG. 3 illustrates the aft and forward booster bleed flow paths 43, 70 from the aft plenums 45 fully closed. The variable bleed valve door 50 in the bleed inlet 47 and the plenum door 80 are in fully closed positions in FIG. 3. FIG. 4 illustrates the aft booster bleed flowpath 43 fully open and the forward booster bleed flowpath 70 fully closed. The variable bleed valve door 50 in the bleed inlet 47 is in a fully open position and the plenum door 80 in a fully closed position in FIG. 4.

Figure 5:
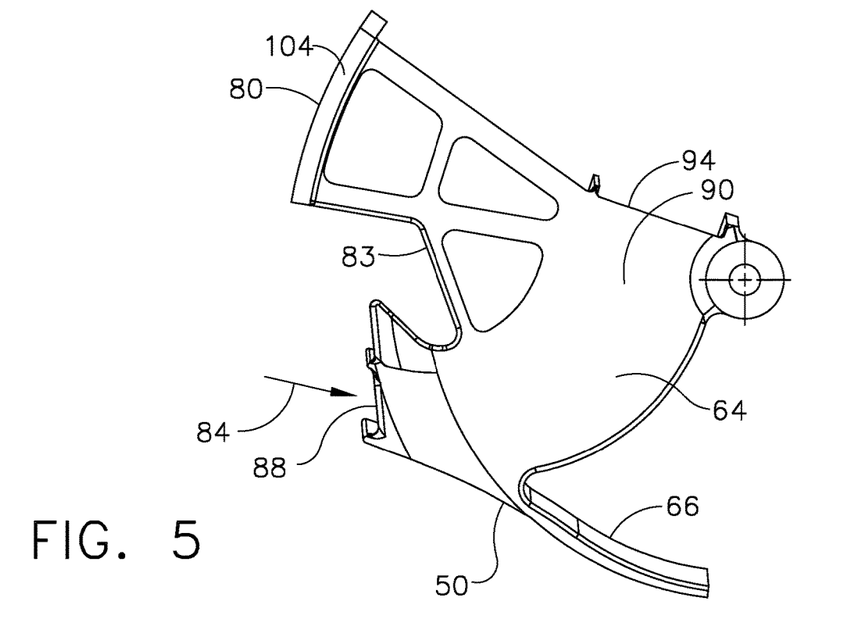
FIG. 5 is a sectional view illustration of a rotatable valve body of the valve illustrated in FIG. 2.
Figure 6:
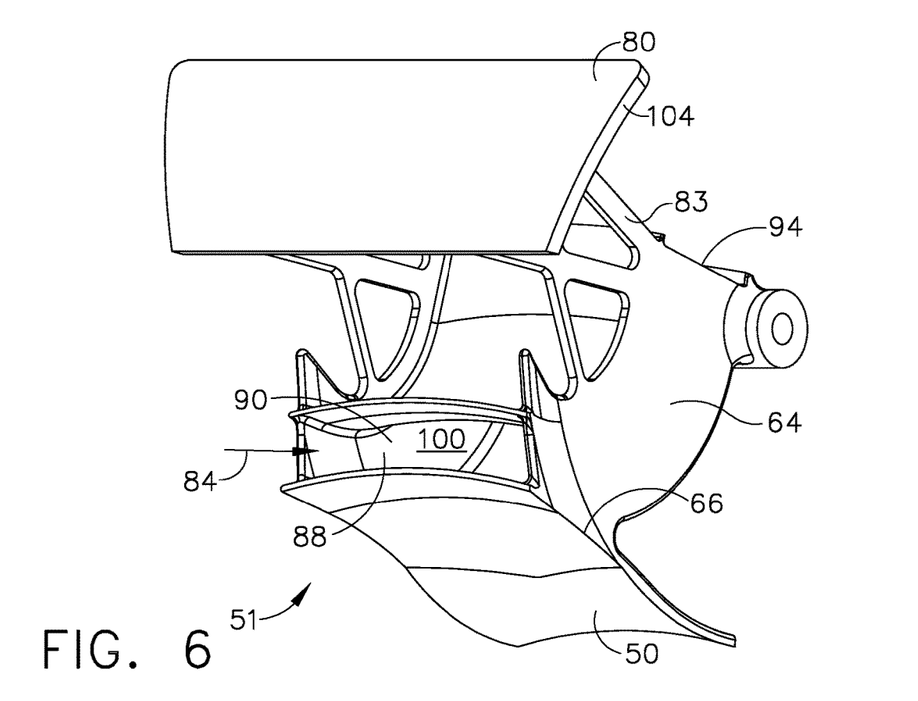
FIG. 6 is a perspective view illustration of the rotatable valve body illustrated in FIG. 5.
Figure 7:
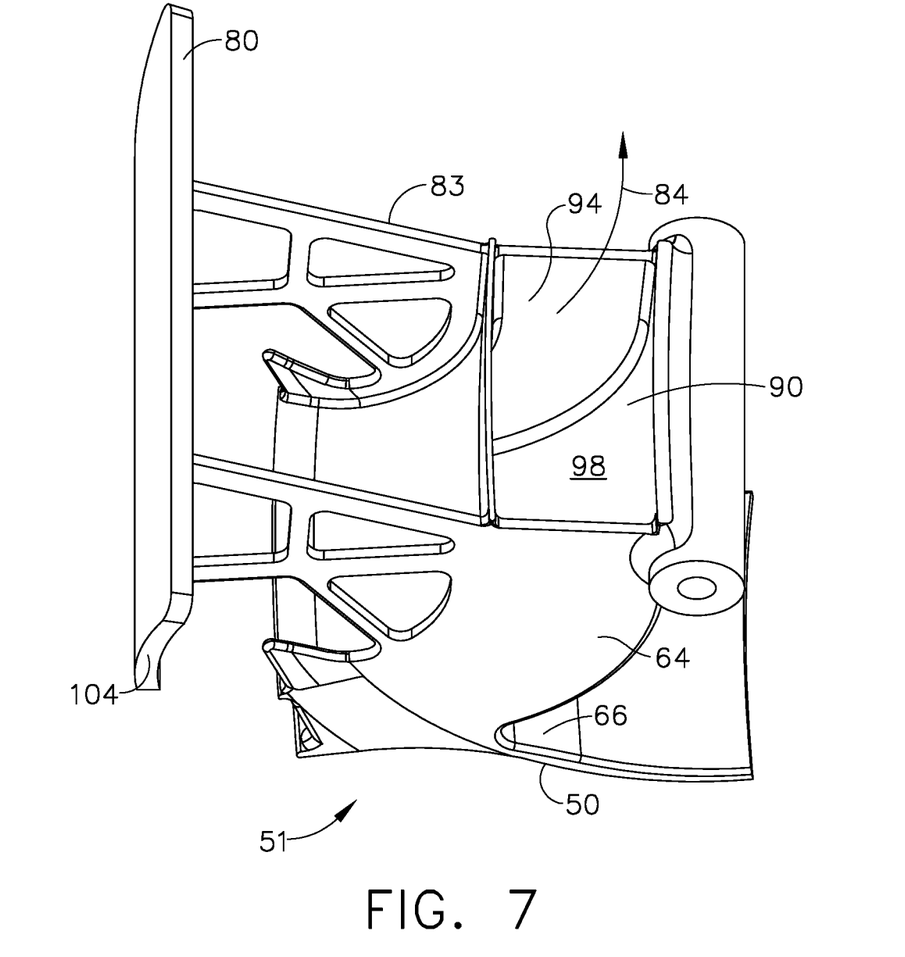
FIG. 7 is a substantially radially inwardly looking perspective view illustration of the rotatable valve body illustrated in FIG. 6.

FIGS. 5-7 illustrates the rotatable valve body 51. The chute 64 on the radially outer side 66 of the VBV door 50 is curved so as to help direct bleed air entering the bleed inlets 47 to more efficiently enter and pass through the aft bleed exhaust duct 58. The chute 64 is sized and shaped to diffuse chute bleed air 84 entering and passing through the chute 64 into the aft plenum 45. The chute bleed air 84 enters the chute 64 through a chute inlet 88, passes through a chute diffuser 90, and exits the diffuser 90 through a chute exit 94. An exemplary embodiment of the chute diffuser 90 has a chute exit area 98 twice the size of a chute inlet area 100.

Figure 8:
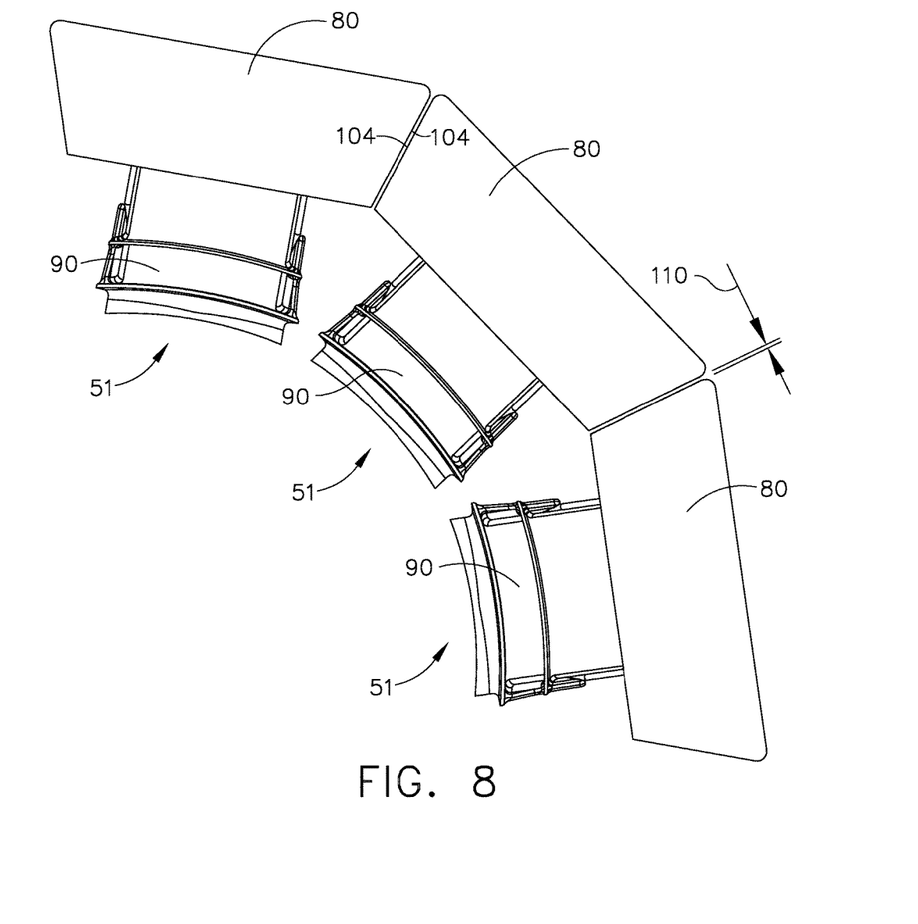
FIG. 8 is an axially aftwardly looking perspective view illustration of three circumferentially adjacent ones of the rotatable valve body illustrated in FIG. 6.
Figure 9:
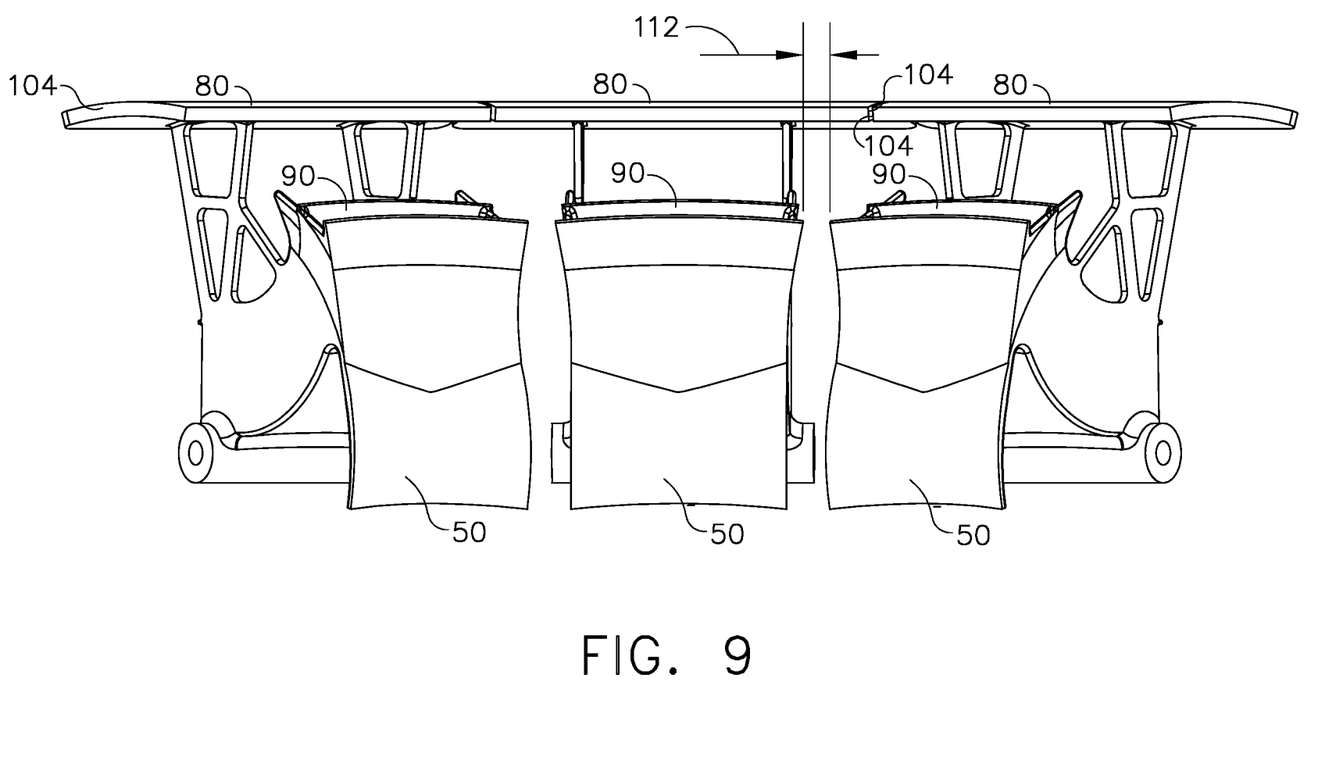
FIG. 9 is a substantially radially inwardly looking perspective view illustration of the rotatable valve bodies illustrated in FIG. 8.

FIGS. 8 and 9 are forward looking aft and radially outwardly looking illustrations respectively of three adjacent rotatable valve bodies 51 including the plenum doors 80 and the VBV doors 50 in the fully open position as illustrated in FIG. 2. Note that the exemplary embodiment of the circumferentially adjacent plenum doors 80 are circumferentially wide and almost touch and have a small plenum door clearance 110 between the circumferentially adjacent sides 104 of the plenum doors 80. A larger VBV door clearance 112 is provided between circumferentially adjacent VBV doors 50 which may be about 10 times greater than the plenum door clearance 110. The wide plenum doors 80 allow for the use of wide inter plenum apertures 62 in the common wall 65 to maximize the amount of bleed air through forward bleed exhaust ducts 68 to the bypass duct 36.

Figure 10:
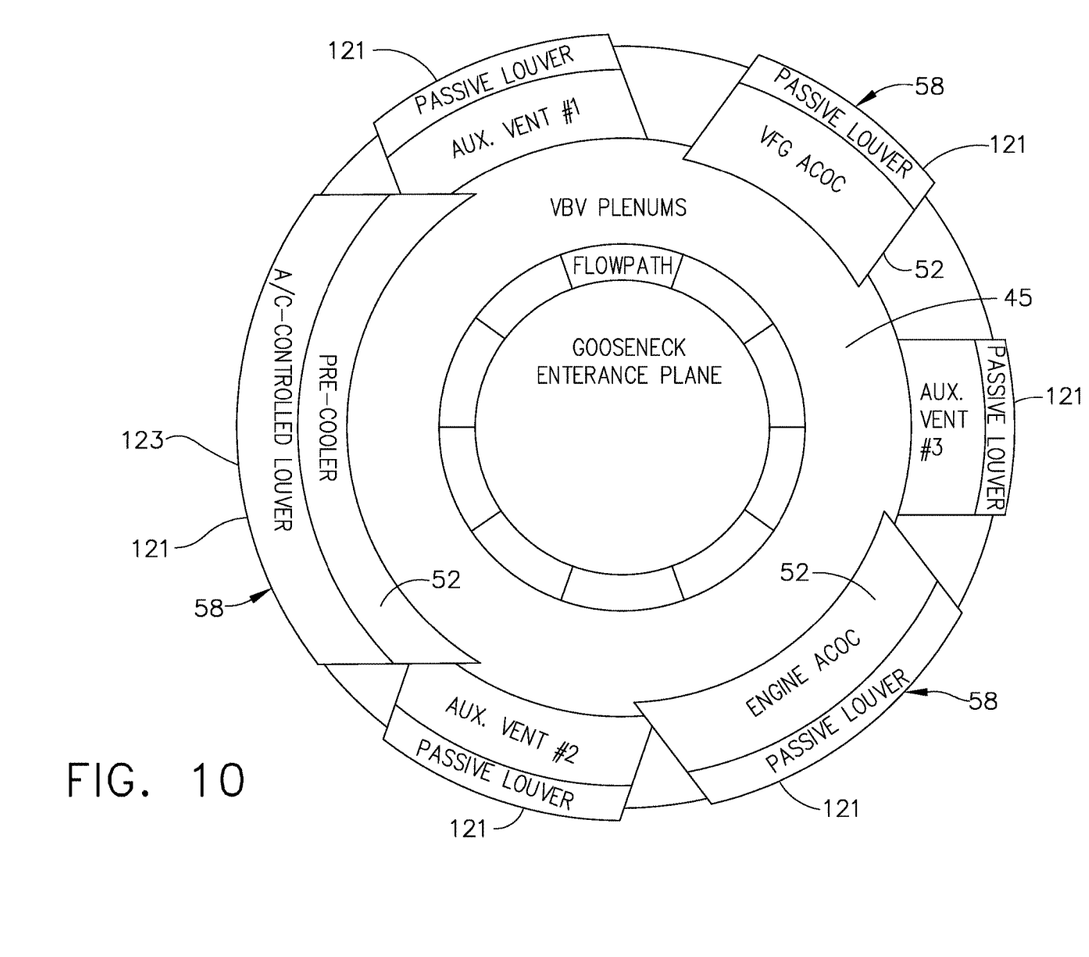
FIG. 10 is a schematical view illustration of the aft and forward bleed passages of the variable bleed valve illustrated in FIG. 1.

Schematically illustrated in FIG. 10 is an exemplary arrangement of three heat exchangers 52, of the thermal management system 54, in three aft bleed exhaust ducts 58. Also, schematically illustrated in FIG. 10 is an exemplary arrangement of three auxiliary vents denoted by #1, #2, and #3 including three forward bleed exhaust ducts 68 around the engine 10. One of the three heat exchangers 52 denoted in FIG. 10 as an air conditioning pre-cooler heat exchanger may be selectively cooled using air conditioning or A/C controlled variable louvers 121 in a respective one of the three aft bleed exhaust ducts 58.

The remaining aft bleed exhaust ducts 58 have passive fixed louvers 121. Another one of the three heat exchangers 52 may be used as an engine Air-Cooled Oil Cooler ACOC to cool oil for the engine bearings 53 and power gear box 46 illustrated in FIG. 1. A third one of the three heat exchangers 52 may be used as a Variable Frequency Generator Air-Cooled Oil Cooler (VFG ACOC) to cool oil in a VFG lubricating circuit for a variable frequency generator. The Engine ACOC heat exchanger rejects heat from the engine gears, bearings, and sumps via an engine lube circuit. The Pre-Cooler heat exchanger cools customer bleed air. Customer bleed air is bled from the compressor, passes through the pre-cooler, and is then delivered to the aircraft (for cabin pressurization, etc.). The three auxiliary vents denoted by #1, #2, and #3 are operability bleed ducts which are fed from the booster bleed forward plenum 60 and allow air to bypass the heat exchangers and are use to maintain booster and compressor operability at several engine operating conditions.

FIG. 11 illustrates an embodiment of the variable bleed apparatus 48 and variable bleed valve 49 (VBV) with a variable bleed valve door 50 disposed in each of the bleed inlets 47 as disclosed herein in an unducted or open rotor aircraft turbofan gas turbine engine 10. The open rotor aircraft turbofan gas turbine engine 10 includes, in downstream serial flow communication, an open rotor fan 14, a low pressure compressor or booster 16, and a high pressure compressor 18. The fan 14 is unducted and rotatable about the engine centerline axis 12. The unducted fan 14 is a variable pitch fan having a plurality of variable pitch unducted fan blades 114 coupled to a disk 143. Each unducted fan blades 114 is rotatable relative to the disk 143 about a pitch axis P by virtue of the fan blades 140 being operatively coupled to a suitable actuation mechanism 142 configured to collectively vary the pitch of the fan blades 114 in unison. The unducted fan 14 is located forward or upstream of a circular row of unducted stator vanes 115. The fan 14 is supported by an annular fan frame 233 circumscribed about the engine centerline axis 12. The fan 14 is rotatable about the engine centerline axis 12 by the low pressure drive shaft 26 across a power gear box 46.

A flow splitter 144 surrounds and in part defines an inlet 117 to the booster 16. The flow splitter 144 includes a sharp leading edge 32 which splits fan air 27 pressurized by the fan 14 into a radially inner stream (core airflow 15) channeled through the booster 16 and a radially outer stream or bypass airflow 17. The booster 16 includes alternating annular rows 44 of booster blades and vanes 38, 42 extending radially outwardly and inwardly across a booster flowpath 39 in a booster duct 40. The fan frame 233 includes an annular fan hub frame 129 supporting an engine nacelle 240 which inwardly bounds the bypass airflow 17 in a bypass flow path 35 and along which the bypass airflow 17 flows.

A transition duct 29 also referred to as a goose neck is located at a radially inner end 136 of the fan hub frame 129 and is axially disposed between and in fluid communication with the booster 16 and the high pressure compressor 18. A plurality (10 are illustrated in the FIGS.) of bleed inlets 47 or openings in a circular row are circumferentially disposed in the outer annular wall 67 of the transition duct 29 between booster 16 and the high pressure compressor 18. The outer annular wall 67 may be conical or curved. A variable bleed apparatus 48 as described above is used to bleed the core airflow 15 between booster 16 and the high pressure compressor 18 to prevent the booster 16 from stalling under certain engine operating conditions.

The variable bleed apparatus 48 illustrated in FIG. 11 includes aft booster bleed flow paths 43 leading from aft plenum 45 through aft bleed exhaust ducts 58 and through the engine nacelle 240 into the bypass airflow 17. Heat exchangers 52 belonging to a thermal management system 54 may be placed in one or more of the aft bleed exhaust ducts 58. Forward booster bleed flow paths 70 lead from the forward plenums 60 through forward bleed exhaust ducts 68 and through the engine nacelle 240 into a bypass flow path 35 and the bypass airflow 17. The forward booster bleed flow paths 70 are used herein for bleeding the bleed air 19 extracted from the core airflow 15 and flowing it through the forward bleed exhaust ducts 68 to the bypass duct 36 to maintain booster and compressor operability at several engine operating conditions. The aft and forward booster bleed flow paths 43, 70 terminate at the engine nacelle 240 aft or downstream of the stator vanes 115.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:
1. A gas turbine engine variable bleed apparatus for use in a gas turbine engine having a centerline axis comprising:
  axially adjacent annular booster bleed aft and forward plenums and an annular common wall therebetween extending generally radially outwardly from a transition duct,
  wherein the annular booster bleed forward plenum is positioned substantially axially forward of the transition duct,
  a variable bleed valve including a variable bleed valve door disposed in a bleed inlet in the transition duct,
  the variable bleed valve door being part of or attached to a rotatable valve body pivotable or rotatable about an axis of rotation, the variable bleed valve door operable to open and close the bleed inlet to the annular booster bleed aft plenum located and extending radially outwardly from the transition duct and the bleed inlet, a rotatable plenum door clocked or circumferentially spaced apart from the variable bleed valve door and being part of or attached to the rotatable valve body, and the rotatable plenum door operable to close and open up and control flow through an inter plenum aperture in the annular common wall between the axially adjacent annular booster bleed aft and forward plenums.

2. The gas turbine engine variable bleed apparatus as claimed in claim 1 further comprising at least one heat exchanger disposed in at least one of aft and forward bleed exhaust ducts in fluid communication with and extending from the axially adjacent annular booster bleed aft and forward plenums respectively.

3. The gas turbine engine variable bleed apparatus as claimed in claim 1 further comprising aft and forward bleed exhaust ducts in fluid communication with and extending from axially adjacent annular booster bleed aft and forward plenums respectively to a bypass flow path and at least one heat exchanger disposed in at least one of aft and forward bleed exhaust ducts.

4. The gas turbine engine variable bleed apparatus as claimed in claim 3 further comprising controlled variable or passive fixed louvers in one of the aft bleed exhaust ducts including the at least one of aft and forward bleed exhaust ducts.

5. The gas turbine engine variable bleed apparatus as claimed in claim 2 further comprising a chute on a radially outer side of the variable bleed valve door and the chute being curved and operable for directing bleed air entering the bleed inlets to and through the aft bleed exhaust duct.

6. The gas turbine engine variable bleed apparatus as claimed in claim 5 further comprising aft and forward bleed exhaust ducts in fluid communication with and extending from the axially adjacent annular booster bleed aft and forward plenums respectively to a bypass flow path and at least one heat exchanger disposed in at least one of aft and forward bleed exhaust ducts.

7. The gas turbine engine variable bleed apparatus as claimed in claim 6 further comprising controlled variable or passive fixed louvers in one of the aft bleed exhaust ducts including the at least one of aft and forward bleed exhaust ducts.

8. The gas turbine engine variable bleed apparatus as claimed in claim 2 further comprising the rotatable plenum door, the inter plenum aperture, and at least a portion of the annular common wall being cylindrical and circumscribed about the axis of rotation.

9. The gas turbine engine variable bleed apparatus as claimed in claim 8 further comprising:

a chute on a radially outer side of the variable bleed valve door, the chute being curved and operable for directing bleed air entering the bleed inlets to and through the aft bleed exhaust duct, aft and forward bleed exhaust ducts in fluid communication with and extending from the axially adjacent annular booster bleed aft and forward plenums respectively to a bypass flow path and at least one heat exchanger disposed in at least one of aft and forward bleed exhaust ducts, and controlled variable or passive fixed louvers in one of the aft bleed exhaust ducts including the at least one of aft and forward bleed exhaust ducts.

10. An aircraft turbofan gas turbine engine comprising:

an engine centerline axis, in downstream serial flow communication, a fan, a low pressure compressor or booster, a high pressure compressor, a combustor, a high pressure turbine, and a low pressure turbine;

the high pressure turbine drivingly connected to the high pressure compressor and the low pressure turbine drivingly connected to both the fan and the low pressure compressor or the booster;

a gas turbine engine variable bleed apparatus circumscribing the engine centerline axis and including axially adjacent annular booster bleed aft and forward plenums and an annular common wall therebetween extending generally radially outwardly from a transition duct between the low pressure compressor or the booster and the high pressure compressor;

wherein the annular booster bleed forward plenum is positioned substantially axially forward of the transition duct, a plurality of bleed inlets in a circular row disposed through an outer annular wall of the transition duct;

a variable bleed valve including a variable bleed valve door disposed in each of the bleed inlets;

the variable bleed valve door being part of or attached to a rotatable valve body pivotable or rotatable about an axis of rotation;

the variable bleed valve door operable to open and close the bleed inlet to the annular booster bleed aft plenum located and extending radially outwardly from the transition duct and the bleed inlet;

a rotatable plenum door clocked or circumferentially spaced apart from the variable bleed valve door and being part of or attached to the rotatable valve body; and the rotatable plenum door operable to close and open up and control flow through an inter plenum aperture in the annular common wall between the axially adjacent annular aft and forward plenums.

11. The aircraft turbofan gas turbine engine as claimed in claim 10 further comprising aft and forward bleed exhaust ducts in fluid communication with and extending from the axially adjacent annular booster bleed aft and forward plenums respectively to a bypass flow path and one or more heat exchangers disposed in one or more aft bleed exhaust ducts respectively.

12. The aircraft turbofan gas turbine engine as claimed in claim 11 further comprising a thermal management system including the one or more heat exchangers.

13. The aircraft turbofan gas turbine engine as claimed in claim 12 further comprising controlled variable or passive fixed louvers in the aft and forward bleed exhaust ducts.

14. The aircraft turbofan gas turbine engine as claimed in claim 13 further comprising a chute on a radially outer side of the variable bleed valve door and the chute being curved and operable for directing bleed air entering the bleed inlets to and through the aft bleed exhaust duct.

15. The aircraft turbofan gas turbine engine as claimed in claim 11 further comprising the rotatable plenum door, the inter plenum aperture, and at least a portion of the annular common wall being cylindrical and circumscribed about the axis of rotation.

16. The aircraft turbofan gas turbine engine as claimed in claim 15 further comprising:

a chute on a radially outer side of the variable bleed valve door,
the chute being curved and operable for directing bleed air entering the bleed inlets to and through the aft bleed exhaust duct,
aft and forward bleed exhaust ducts in fluid communication with and extending from the axially adjacent annular booster bleed aft and forward plenums respectively to a bypass flow path,
a thermal management system including one or more heat exchangers disposed in one or more aft bleed exhaust ducts respectively, and
controlled variable or passive fixed louvers in the aft and forward bleed exhaust ducts.

17. The aircraft turbofan gas turbine engine as claimed in claim 15 further comprising:
an annular fan frame circumscribed about an engine centerline axis and supporting the fan, and
the variable bleed valve door hinged by a hinge attached to a fan hub frame of the fan frame and the rotatable plenum door, the inter plenum aperture, and at least a portion of the annular common wall being cylindrical and circumscribed about the axis of rotation.

18. The aircraft turbofan gas turbine engine as claimed in claim 17 further comprising:
a chute on a radially outer side of the variable bleed valve door,
the chute being curved and operable for directing bleed air entering the bleed inlets to and through the aft bleed exhaust duct,
the aft and forward bleed exhaust ducts in fluid communication with and extending from the axially adjacent annular booster bleed aft and forward plenums respectively to a bypass flow path,
a thermal management system including one or more heat exchangers disposed in one or more of the aft bleed exhaust ducts respectively, and
controlled variable or passive fixed louvers in the aft and forward bleed exhaust ducts.

19. The aircraft turbofan gas turbine engine as claimed in claim 17 further comprising:
a fan casing circumscribing the engine centerline axis and surrounding the fan and a bypass duct containing the bypass flow path,
the bypass duct located downstream or aft of the fan and spaced radially outwardly from the booster,
an annular fan frame supporting the fan casing, and
the annular fan frame including an annular outer frame casing, the fan hub frame, and a plurality of circumferentially spaced apart duct struts extending between the outer frame casing and the fan hub frame.

20. The aircraft turbofan gas turbine engine as claimed in claim 19 further comprising a thermal management system including one or more heat exchangers disposed in one or more aft bleed exhaust ducts respectively.

21. The aircraft turbofan gas turbine engine as claimed in claim 20 further comprising:
a power gear box operably disposed between the low pressure turbine and the fan for adjusting rotational speed of the fan relative to the low pressure turbine,
engine bearings rotatably supporting at least one of the low pressure turbine, the fan, the high pressure compressor and the high pressure turbine, and
one of the heat exchangers being an engine air-cooled oil cooler operable for cooling oil for the power gear box and/or engine bearings.

22. The aircraft turbofan gas turbine engine as claimed in claim 21 further comprising:
second and third ones of the heat exchangers disposed in second and third ones of the aft bleed exhaust ducts respectively,
the second one of the heat exchangers being an air conditioning pre-cooler heat exchanger operable for being selectively cooled using air conditioning controlled variable louvers in the second one of the aft bleed exhaust ducts, and
a third one of the heat exchangers being a variable frequency generator air-cooled oil cooler for cooling oil in a variable frequency generator lubricating circuit for a variable frequency generator.

23. The aircraft turbofan gas turbine engine as claimed in claim 17 further comprising:
the aircraft turbofan gas turbine engine being an unducted or open rotor aircraft turbofan gas turbine engine wherein the fan is unducted and is located forward or upstream of a circular row of unducted stator vanes, and
an annular fan frame rotatably supporting the fan and an annular fan hub frame supporting an engine nacelle inwardly bounding the bypass flow path.

24. The aircraft turbofan gas turbine engine as claimed in claim 23 further comprising a thermal management system including one or more heat exchangers disposed in one or more aft bleed exhaust ducts respectively.

25. The aircraft turbofan gas turbine engine as claimed in claim 24 further comprising:
a power gear box operably disposed between the low pressure turbine and the fan for adjusting rotational speed of the fan relative to the low pressure turbine,
engine bearings rotatably supporting at least one of the low pressure turbine, the fan, the high pressure compressor and the high pressure turbine, and
one of the heat exchangers being an engine air-cooled oil cooler operable for cooling oil for the power gear box and/or engine bearings.

26. The aircraft turbofan gas turbine engine as claimed in claim 25 further comprising:
second and third ones of the heat exchangers disposed in second and third ones of the aft bleed exhaust ducts respectively,
the second one of the heat exchangers being an air conditioning pre-cooler heat exchanger operable for being selectively cooled using air conditioning controlled variable louvers in the second one of the aft bleed exhaust ducts, and
a third one of the heat exchangers being a variable frequency generator air-cooled oil cooler for cooling oil in a variable frequency generator lubricating circuit for a variable frequency generator.

* * * * *